March 12, 1957 D. W. HAMM 2,785,027
EXPANDER STRUCTURE FOR PISTON RINGS
Filed Nov. 24, 1954
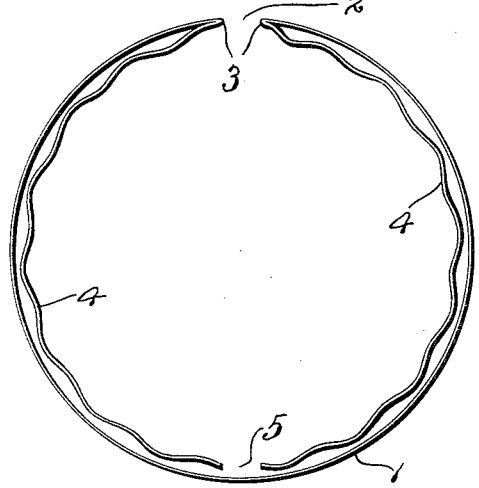
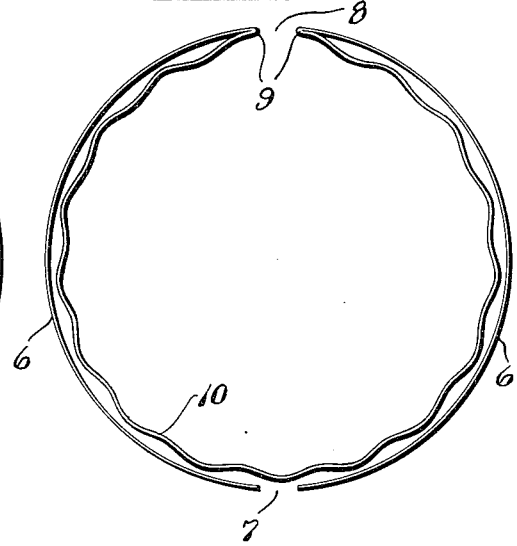
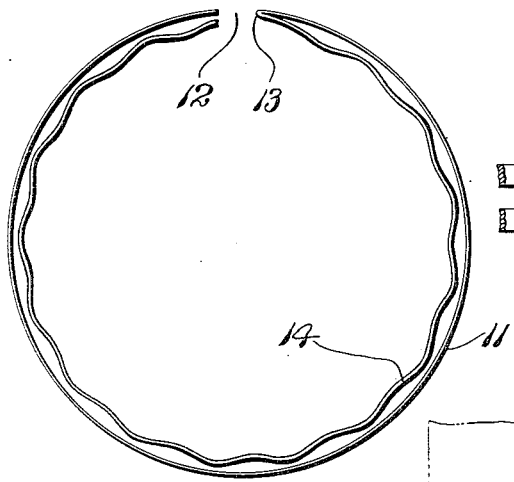
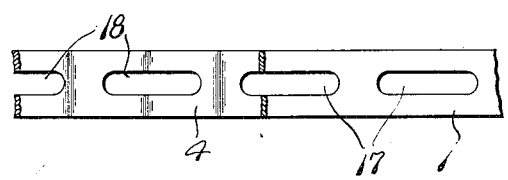
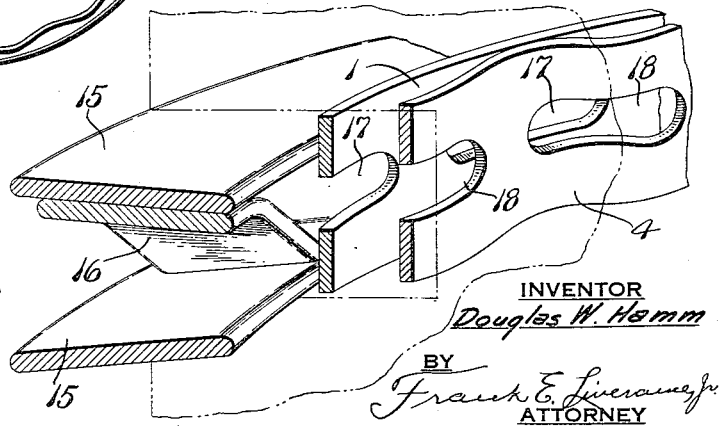
INVENTOR
Douglas W. Hamm
BY
Frank E. Liverance Jr.
ATTORNEY

2,785,027
EXPANDER STRUCTURE FOR PISTON RINGS

Douglas W. Hamm, Muskegon, Mich., assignor to Muskegon Piston Ring Company, Muskegon, Mich., a corporation of Michigan Application November 24, 1954, Serial No. 470,967

8 Claims. (Cl. 309—43)

The present invention relates to a unit expander structure for piston rings. Piston rings of various types have parted corrugated spring metal expanders back of them in the grooves of pistons for increasing the unit pressure of the outer wearing face of a piston ring against the cylinder wall in an internal combustion engine. Such expanders are particularly used in conjunction with oil salvaging rings though not restricted thereto, which oil salvaging rings in general have upper and lower parted steel rails made of material which may be from .020" to .025" thick. Between the rails a spacer, which has oil passage or vent openings therethrough, is placed in order to maintain the rails in close adjacency to the upper and lower sides of a piston ring groove in which a piston ring is installed.

Such piston rings consisting of the two spaced rails and a spacer between them have been largely used until recently for replacement of piston rings which have become damaged, broken, clogged or otherwise deteriorated in action, the serviceman having sufficient time for installation of the three parts of the piston ring, together with an expander behind it. Such three part ring was impractical because of the time used and trouble encountered in installation on the line of engine building in a factory. This has been solved so that such rails together with the spacer may be installed as a unit by cementing the rails and spacer together with a type of cement which, under high temperature and the influence of lubricating oil, dissolves so that in a short time the three parts of the piston ring are independently movable with respect to each other.

To cure the passage of lubricating oil past the oil salvaging ring from its lower to its upper side I have invented and there is filed on the same, applications for patent making use of a thin metal shim or ring member which, having an axial width but slightly less than the like width of a piston ring groove, is located within the groove bearing against the inner edges of the rails of the piston ring and back of it. Between it and the bottom of the piston ring groove a well known spring metal expander is placed. For installation this requires that three separate and distinct parts, the expander, such shim and the cemented together or unitized oil salvaging ring shall be individually handled.

The present invention is directed to a simple, practical and novel expander unit in which the expander and the shim member, which has been added to piston rings used primarily in the oil grooves of pistons, may be handled and installed as a unit in a piston ring groove so that, as before, notwithstanding the addition of such shim, there are only two unit members which have to be handled during installation, one consisting of the unitized piston ring and the other of the novel unit which I have invented and which includes both the corrugated expander and the mentioned shim member connected for handling and installation as a unit. After such installation the expander and the shim member connected together do not thereafter necessarily disconnect but may remain integrally connected in use, but both are sufficiently free of each other in action and movement that they fully and completely serve their purposes for which designed.

An understanding of the invention may be had from the following description taken in connection with the accompanying drawing, in which, Fig. 1 is a plan view of the unit expander structure for piston rings of my invention shown in one form thereof.

Figs. 2 and 3 are like views showing additional and equivalent forms of embodying the invention.

Fig. 4 is a fragmentary enlarged inner elevation of a piston ring made in accordance with my invention, parts of the expander being broken away to show the outer surrounding ring member, and Fig. 5 is an enlarged fragmentary perspective view illustrating the manner in which said unit structure is installed at the bottom of a piston ring groove with the piston ring in the groove outwardly of such unit expander and ring member construction.

Like reference characters refer to like parts in the different figures of the drawing.

In Fig. 1 the ring member 1, of a generally circular form made from thin flat metal, has a parting at 2 where the ends of the member approach each other. At such parting the inner expander, which comprises two sections 4, integrally connected each at their ends adjacent the parting 2 with the ends of the ring member 1, each section 4 being continued around and inside the ring member 1 until the ends of said sections 4 approach each other but are separated by a second parting at 5. The corrugated sections 4 have inwardly and outwardly extending humps, the outer humps of which in use press against the inner side of the ring member 1, while the inner humps are pressed against the bottom of a piston ring groove in which installed.

In Fig. 2 the outer ring is of two sections 6 which have a parting as at 7 between adjacent ends and diametrically opposite a second parting 8 which is similar to the parting at 2 in Fig. 1. The metal is bent back upon itself at 9, at each side of the parting 8, and provides a single corrugated expander 10 which lies within the outer ring sections 6. In Fig. 3 the outer ring member 11 is continuous except at one side, at the parting 12. At one end of the ring member 11, at said parting 12, the metal is bent back upon itself at 13 and continued around the inside of the ring member 11 to make a continuous expander 14, substantially to the parting at 12.

All of these forms of structure which embody the same invention are equivalent in results and functions produced. Each is a unit and may be handled as such. In Fig. 5, a common type of unitized oil salvaging ring is shown having upper and lower thin metal rails 15 which are parted at one side to pass over a piston, and between which is a spacer 16 of a conventional structure corrugated so as to provide alternate U-shaped successive corrugations against upper and lower flat surfaces of which the rails 15 engage and to which they are preferably cemented so that the piston ring may be handled as a unit.

On installing in a piston, shown in dot and dash lines in Fig. 5, the parting at 2 or 8 or 12, dependent upon which form of the unit structure is used, is opened so that the unit structure may be carried downwardly over the upper end or head of a piston to a ring groove to receive the unit structure. When inserted in the ring groove the expander sections 4 of the form shown in Fig. 1, press with their inwardly extending humps against the bottom of the ring groove while their outwardly extending humps are against the inner side of the flat ring member 1. Such shim is between the expander and the inner edges of the rails 15 against which the shim member 1 presses. In the form shown in Figs. 2 and 3, the complete expanders 10 and 14 are located at the same places as the sections 4 in Fig. 1 while the shim sections 6 of Fig. 2, and the continuous shim 11 of Fig. 3, occupy the same position as the shim 1 of the form shown in Fig. 1.

The shim member and expander are provided with oil vents or passages 17 and 18, respectively, which when an installation on a piston and within a cylinder of an engine has been made, will be in substantial alignment. However, such preferred location of the vent openings 17 and 18 is not a vital or essential feature of the invention and may be supplied by other equivalent vent openings or passages.

With such construction of the combined ring member and expander in any and all of the equivalent forms shown, handling for assembly and installation requires the handling of only one unit which is desirable, in fact practically necessary, for the utilization of the invention in connection with original engine construction and installation, not limiting the use of the invention to repair and replacement work.

The invention is defined in the appended claims and is to be considered comprehensive of all forms of structure coming within their scope.

I claim:

1. An outer parted ring member of thin flat material, and an inner parted corrugated spring expander of thin metal having alternate inwardly and outwardly extending humps, the outer humps being adapted to bear against the inner sides of said ring member, said expander having fixed connection with the ring member adjacent a parting in said ring member.

2. An outer ring member of generally circular form made from thin metal having a parting therein, and an inner parted corrugated spring expander having a parting therein integrally connected with the ring member at said partings therein, said expander having alternate inwardly and outwardly extending humps, the outer humps being adapted to bear against the ring member, whereby the ring member and expander are made from a single continuous length of thin spring material.

3. An expander unit for piston ring groove installation comprising, a corrugated expander of thin metallic spring material having alternate inwardly and outwardly extending humps, and a ring of thin metal surrounding said expander connected to said expander, said ring member and expander having a common parting at a side of each for passage over a piston to a ring groove therein, and said ring member and expander being free of connection to each other except adjacent said common parting.

4. An expander unit comprising, a generally circular ring member of thin metal having a parting at a side thereof and vent openings therethrough, and a corrugated vented expander with alternate inwardly and outwardly extending humps located within and surrounded by said ring member, said ring member and expander having integral connection at one end of each said ring member and expander, at said parting, said expander extending to approximately the other end of said ring member at said parting therein.

5. A piston ring expander unit comprising, a generally circular, thin metal, inner corrugated expander and a generally circular, thin metal, outer ring member, one within the other, and each having a common parting at one side, with adjacent ends of said ring member and expander at said parting integrally connected, one of said ring member and expander having an additional parting at a distance from said first mentioned parting.

6. A piston ring expander unit comprising, a generally circular, thin metal, inner corrugated expander, and a generally circular, thin metal outer ring member, the expander being located within the ring member and each having a common parting at one side, with adjacent ends of said ring member and expander integrally connected at said parting, said outer ring member having an additional parting at a distance from said first mentioned parting.

7. A piston ring expander unit comprising, a generally circular, thin metal, inner corrugated expander, and a generally circular, thin metal outer ring member, one within the other, and each having a common parting at one side, with adjacent ends of said ring member and expander integrally connected at said parting, said expander having an additional parting at a distance from the first mentioned parting.

8. A piston ring expander unit comprising, an outer generally circular, thin metal ring member, and a corrugated, generally circular, thin metal expander within said ring member, said expander and ring member having each a parting at one side aligned with each other, and means connecting said ring member and expander at a common point in each to secure them together, free from each other except at said connection.

References Cited in the file of this patent
UNITED STATES PATENTS

| | | |
|---|---|---|
| 246,712 | Booth | Sept. 6, 1881 |
| 1,966,782 | Zeledon | July 17, 1934 |
| 2,468,980 | Huber | May 3, 1949 |